(12) United States Patent
Ito et al.

(10) Patent No.: US 7,889,418 B2
(45) Date of Patent: Feb. 15, 2011

(54) ELECTRO-OPTICAL DISPLAY, ELECTROPHORETIC DISPLAY, AND ELECTRONIC DEVICE

(75) Inventors: Wataru Ito, Chino (JP); Hikari Yuzawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 226 days.

(21) Appl. No.: 12/389,725

(22) Filed: Feb. 20, 2009

(65) Prior Publication Data
US 2009/0237775 A1 Sep. 24, 2009

(30) Foreign Application Priority Data
Mar. 21, 2008 (JP) .............................. 2008-073583

(51) Int. Cl.
*G02B 26/00* (2006.01)
*G02F 1/03* (2006.01)
(52) U.S. Cl. .................. 359/295; 359/245; 345/87; 345/107
(58) Field of Classification Search ............ 359/296; 345/87, 107
See application file for complete search history.

(56) References Cited

U.S. PATENT DOCUMENTS
2009/0237775 A1* 9/2009 Ito et al. .................. 359/296

FOREIGN PATENT DOCUMENTS
| JP | 2005-114820 | 4/2005 |
| JP | 2005-114822 | 4/2005 |
| JP | 2007-072127 | 3/2007 |

* cited by examiner

*Primary Examiner*—Evelyn A. Lester
(74) *Attorney, Agent, or Firm*—AdvantEdge Law Group, LLC

(57) ABSTRACT

An electro-optical display includes a first substrate and a second substrate opposing to each other, a display layer disposed between the first substrate and the second substrate, and a cover layer covering a surface of the second substrate on an opposite side of the display layer. A surface of the display layer disposed on the first substrate is a display face, and the first substrate and the cover layer are bonded with a moisture-proof resin disposed at a sealing region surrounding the display face. The first substrate and/or the cover layer have a groove in the surface that is in contact with the moisture-proof resin, and the groove is filled with the moisture-proof resin.

11 Claims, 7 Drawing Sheets

ELECTRO-OPTICAL DISPLAY, ELECTROPHORETIC DISPLAY, AND ELECTRONIC DEVICE

BACKGROUND

1. Technical Field

The present invention relates to an electro-optical display, an electrophoretic display, and an electronic device.

2. Related Art

Flat electro-optical displays represented by liquid crystal displays are utilized in various electronic devices, such as OA equipment, information terminals, clocks, and televisions, by taking advantage of the characteristics such as thin profile, lightness in weight, and low power consumption.

Recently, as the electro-optical displays having such characteristics, electrophoretic displays (EPDs) have been remarkably developed. Among the electrophoretic displays, in particular, film-like displays have character visibility and flexibility similar to those of paper media and are therefore known as electronic papers.

A microcapsule-type electrophoretic display (microcapsule-type EPD) is a typical electrophoretic display.

In the microcapsule-type electrophoretic display, microcapsules containing a medium dispersing electrically charged particles are disposed between electrodes, and contrast is obtained by applying a voltage between the electrodes to generate an electric field and thereby changing the distribution of the electrically charged particles.

The electrophoretic display has a characteristic that the electrically charged particles attracted to one side in the microcapsules remain near the electrode by electrostatic force or intermolecular force even if the application of the voltage is stopped, and thereby the displayed image can be retained without consuming power.

Furthermore, in the electrophoretic display, the color (reflected light) of the electrically charged particles or the solvent itself is observed, unlike devices such as liquid crystal displays utilizing transmitted light from backlight or light-emitting devices such as organic EL displays. Therefore, characteristically, the electrophoretic display does not exhibit view angle dependency and is gentle to eyes as in paper to allow being gazed for a long time. In particular, such a characteristic, being a reflective display device in which reflected light from electrically charged particles is observed, is advantageous when it is used under sunlight.

Furthermore, the film-like electrophoretic display has an excellent property, i.e., flexibility. That is, an electrophoretic display having flexibility can be easily realized by using films of, for example, a resin as the two substrates holding the microcapsules therebetween.

However, when the films instead of glass substrates are used as the two substrates holding the microcapsules therebetween, a problem of deterioration of the electrophoretic display due to infiltration of moisture occurs.

In the case of the glass substrates, effect of preventing infiltration of moisture can be sufficiently increased. However, in the case of the films, it is difficult to maintain such effect high. When an electrophoretic display configured using the films is exposed to high temperature and high humidity for a long period of time, deterioration is caused by infiltration of moisture, resulting in a significant decrease in display quality.

In particular, when the display may be used in outdoor environment, deterioration due to changes in temperature and humidity is concerned. Therefore, sufficient moisture protection is required.

JP-A-2005-114820 and JP-A-2005-114822 disclose electrophoretic displays having a structure in which a transparent resin overcoat is laminated on a substrate on a display face side for improving moisture-proof property, and a steam-blocking resin layer is disposed in a gap between the transparent resin overcoat and a substrate on a non-display face side, at the edge surface of the periphery of the displaying surface, for blocking infiltration of moisture.

However, even in the above-mentioned technology, for example, under the environment of a high temperature of about 60° C. and a high humidity of about 90%, moisture infiltrates from the edge surface of the periphery and the back face, which causes degeneration of the electrophoretic material, resulting in deterioration of the display characteristics and retention characteristics.

JP-A-2007-72127 discloses an electrophoretic device whose moisture-resistance property is further improved. This electrophoretic device has a structure in which moisture-proof films are disposed at the top and the bottom of an electrophoretic layer and a moisture-proof resin is further disposed in the periphery of the moisture-proof films, in order to prevent the infiltration of moisture into the electrophoretic layer.

However, in order to ensure a sufficient moisture-proof property by this structure, it is required that the top and bottom moisture-proof films have a high adhesion, in addition to a sufficient moisture-proof property of the material itself.

If the adhesion between the moisture-proof films and the moisture-proof resin is insufficient, moisture infiltrates into the electrophoretic layer using the interfaces as diffusion paths, which may cause a failure that the display quality of the electrophoretic device is deteriorated. Consequently, countermeasures, for example, enlargement of the sealing width, are necessary. The enlargement of the sealing width causes expansion of the periphery of the non-display area, which develops a problem that the merchantability of the electronic paper is significantly decreased.

SUMMARY

An advantage of some aspects of the invention is to provide an electro-optical display, an electrophoretic display, and an electronic device that have a sufficient moisture-proof property.

In order to achieve the above-mentioned advantage, the invention employs the following configuration:

The electro-optical display according to the invention includes a first substrate and a second substrate opposing to each other, a display layer disposed between the first substrate and the second substrate, and a cover layer covering a surface of the second substrate on an opposite side of the display layer, wherein a surface of the display layer disposed on the first substrate is a display face, and the first substrate and the cover layer are bonded with a moisture-proof resin disposed at a sealing region surrounding the display face; and the first substrate and/or the cover layer have a groove in the surface that is in contact with the moisture-proof resin, and the groove is filled with the moisture-proof resin.

Since the electro-optical display of the invention is configured such that the first substrate and/or the cover layer have the groove in the surface that is in contact with the moisture-proof resin and the groove is filled with the moisture-proof resin, the shortest distance (interface distance) connecting the outside and the inside on the surface of the first substrate and/or the cover layer that are in contact with the moisture-proof resin can be enlarged, and therefore the amount of moisture that infiltrates into the display layer from the outside of the electro-optical display through the interface having such a distance can be decreased. Since the sealing width of the sealing region is not increased, the size of the display region can be maintained large, and the display performance of the electro-optical display can be maintained.

In the electro-optical display according to the invention, the groove is preferably provided in the surface on the display layer side of the first substrate in the sealing region, and the depth of the groove is one half or less the thickness of the first substrate.

Since the electro-optical display of the invention is configured such that the depth of the groove provided in the surface on the display layer side of the first substrate in the sealing region is one half or less the depth of the first substrate, the moisture-proof property can be improved, and the display performance can be maintained, and also the mechanical strength of the first substrate can be maintained.

In the electro-optical display according to the invention, the groove is preferably provided in the surface on the display layer side of the cover layer in the sealing region.

Since the electro-optical display of the invention is configured such that the groove is provided in the surface of the display layer side of the cover layer in the sealing region, the interface distance of the cover layer being in contact with the moisture-proof resin can be enlarged, and therefore the amount of moisture that infiltrates into the display layer from the outside of the electro-optical display through the interface having such a distance can be decreased. Since the sealing width of the sealing region is not increased, the size of the display region can be maintained large, and the display performance of the electro-optical display can be maintained.

In the electro-optical display according to the invention, the cover layer is preferably composed of a laminate of a plurality of moisture-proof bases and an inorganic material layer disposed between the moisture-proof bases at least such that the inorganic material layer is in contact with the moisture-proof base on the uppermost side, and the groove has a depth such that the groove does not pass through the inorganic material layer.

Since the electro-optical display of the invention is configured such that the cover layer is composed of a laminate of a plurality of moisture-proof bases and an inorganic material layer disposed between the moisture-proof bases at least such that the inorganic material layer is in contact with the moisture-proof base on the uppermost side, and the groove has a depth that does not pass through the inorganic material layer, the inorganic material layer is not exposed even if the groove is formed, and therefore the moisture-proof effect can be maintained.

In the electro-optical display according to the invention, the groove is preferably provided at the side end of the cover layer in the sealing region.

Since the electro-optical display of the invention is configured such that the groove is provided at the side edge of the cover layer in the sealing region, the interface distance of the cover layer being in contact with the moisture-proof resin can be enlarged, and the amount of moisture that infiltrates into the display layer from the outside of the electro-optical display through the interface having such a distance can be decreased. In addition, since the sealing width of the sealing region is not increased, the size of the display region can be maintained large, and the display performance of the electro-optical display can be maintained.

In the electro-optical display according to the invention, the cover layer is preferably composed of a laminate of a plurality of moisture-proof bases and an inorganic material layer disposed between the moisture-proof bases at least such that the inorganic material layer is in contact with the moisture-proof base on the uppermost side, and the groove is arranged nearer the display layer than the inorganic material layer.

Since the electro-optical display of the invention is configured such that the cover layer is composed of a laminate of a plurality of moisture-proof bases and an inorganic material layer disposed between the moisture-proof bases at least such that the inorganic material layer is in contact with the moisture-proof base on the uppermost side, and the groove is arranged nearer the display layer than the inorganic material layer, the area of the cover layer being in contact with the moisture-proof resin can be enlarged, and the amount of moisture that infiltrates into the display layer from the outside of the electro-optical display through the contact face can be decreased. In addition, since the sealing width of the sealing region is not increased, the size of the display region can be maintained large, and the display performance of the electro-optical display can be maintained.

In the electro-optical display according to the invention, the groove preferably surrounds a corner of the display region.

Since the electro-optical display of the invention is configured such that the groove surrounds the corner of the display region, the moisture-proof property at the corner where moisture infiltrates from two side faces can be improved. In particular, the moisture-proof property at the corner can be improved by forming such additional grooves for each corner.

In the electro-optical display according to the invention, a plurality of the grooves is provided.

Since the electro-optical display of the invention is configured such that a plurality of the grooves is provided, the area of the contact face can be enlarged, and thereby the moisture-proof property can be further improved.

In the electro-optical display according to the invention, a surface protection sheet is preferably bonded to a surface of the cover layer on the opposite side with respect to the display layer.

Since the electro-optical display of the invention is configured such that the surface protection sheet is bonded to the cover layer, the cover layer can be protected from mechanical impact from the outside and is not damaged even if some impact is applied to. Therefore, the inorganic material layer is not exposed, and the moisture-proof property can be maintained.

In the electrophoretic display according to the invention, the display layer of the above-described electro-optical display is an electrophoretic layer.

Since the electrophoretic display of the invention is configured such that the display layer of the above-described electro-optical display is an electrophoretic layer, the moisture-proof property of the electrophoretic display can be improved, while maintaining the display performance.

The electronic device according to the invention includes the above-described electro-optical display or the above-described electrophoretic display.

Since the electronic device of the invention is configured so as to have the above-described electro-optical display or the above-described electrophoretic display, the moisture-proof property of the electrophoretic device can be improved, while maintaining the display performance.

According to the above-described configuration, an electro-optical display, an electrophoretic display, and an electronic device that have sufficient moisture-proof property can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments for carrying out the invention will be described below.

Embodiment 1

An electro-optical display 150 according to an embodiment of the invention will be described with referring to an electrophoretic display 100.

Figure 1:
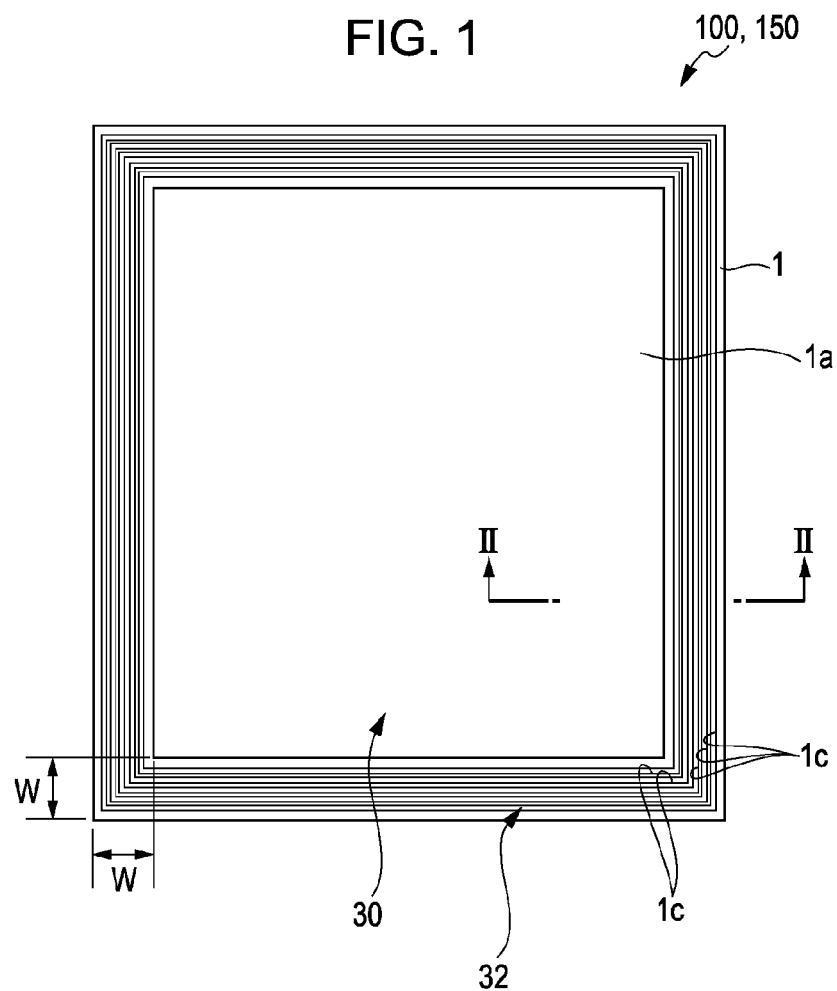
FIG. 1 is a plan view illustrating an electrophoretic display according to the invention.
Figure 2:
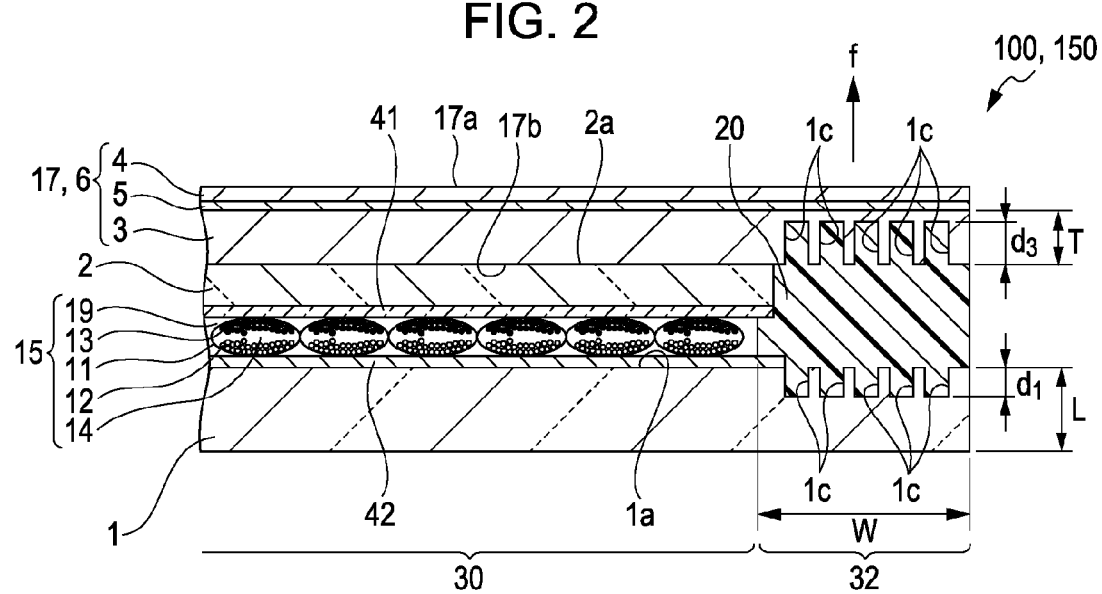
FIG. 2 is a cross-sectional view illustrating the electrophoretic display according to the invention.

FIGS. 1 and 2 are drawings illustrating an example of the electrophoretic display 100, which is an embodiment of the invention. FIG. 1 is a plan view, and FIG. 2 is a cross-sectional view taken along the line II-II in FIG. 1.

As shown in FIG. 1, the electrophoretic display 100 according to the embodiment of the invention is roughly configured to include a display face (display region) 30 having an approximately rectangular shape where an electrophoretic layer (display layer) 15 is disposed on a surface 1a of a first substrate 1 and a sealing region 32 surrounding the display face (display region) 30. The sealing width of the sealing region is defined as W.

In the sealing region 32, the surface 1a of the first substrate 1 is provided with a plurality of grooves 1c so as to surround the display face (display region) 30.

As shown in FIG. 2, the electrophoretic display 100 according to the embodiment of the invention is configured by including a thin-film circuit layer 42 disposed on the surface 1a of the first substrate 1, the electrophoretic layer (display layer) 15 disposed on the thin-film circuit layer 42, a transparent electrode layer 41 disposed on the electrophoretic layer (display layer) 15, a second substrate 2 disposed on the transparent electrode layer 41, and a cover layer 17 disposed on a surface 2a of the second substrate 2 on the opposite side with respect to the display layer. The cover layer 17 is composed of a transparent moisture-proof sheet 6 including two moisture-proof bases 3 and 4 and an inorganic material layer 5 disposed between the moisture-proof bases 3 and 4. The first substrate 1 and the cover layer 17 are bonded to each other with a moisture-proof resin 20 arranged at the sealing region 32. This is configured such that an observer can observe the display layer 15 from the front direction f.

First Substrate 1

The first substrate 1 is, for example, made of an insulating material, such as a glass substrate or a quartz substrate, and has a function for supporting the thin-film circuit layer 42, the electrophoretic layer 15, and pixel electrodes (not shown) disposed thereabove. The first substrate 1 may be a resin substrate, such as PET.

The thickness of the first substrate 1 is appropriately determined depending on, for example, the material and the application and is not particularly limited, but is preferably about 20 to 500 μm and more preferably about 25 to 200 μm as the circuit board of a display module. By doing so, the electrophoretic device can be reduced in size, in particular, in the thickness thereof, while adjusting the strength as an electrophoretic device.

Thin-Film Circuit Layer

The thin-film circuit layer 42 is bonded on the first substrate 1 via, for example, an adhesion layer composed of a UV (ultraviolet)-curing adhesive by a thin-film transfer technique or the like.

The thin-film circuit layer 42 includes, for example, thin-film devices such as thin-film transistors (TFT) for driving the electrophoretic layer (display layer) 15, a thin-film wiring layer, and pixel electrodes used for applying a voltage to the electrophoretic layer (display layer) 15.

Examples of the material for the thin-film devices include organic semiconductor materials. Examples of the materials for the thin-film wiring layer and the pixel electrodes include metals such as aluminum, nickel, cobalt, platinum, gold, silver, copper, molybdenum, titanium, and tantalum, and alloys containing these metals. These materials may be used alone or in a combination of two or more.

The thickness of the thin-film circuit layer 42 is appropriately determined depending on, for example, the material and the application and is not particularly limited, but is preferably about 0.05 to 10 μm and more preferably about 0.05 to 5 μm as the thin-film circuit layer of a display module.

Electrophoretic Layer

As shown in FIG. 2, the electrophoretic layer (display layer) 15 is disposed between the first substrate 1 and the second substrate 2. The electrophoretic layer (display layer) 15 includes a resin layer 19 serving as a binder arraying a large number of microcapsules 11. The thickness of the electrophoretic layer (display layer) 15 is not particularly limited, but is preferably about 10 to 150 μm and more preferably 30 to 100 μm as the electrophoretic layer of a display module.

The microcapsules 11 each contain a plurality of white electrophoretic particles 12 and a plurality of black electrophoretic particles 13 that are dispersed (suspended) in a liquid phase dispersion medium 14.

Microcapsules

Examples of the material of the microcapsules 11 include various types of resins such as gelatin, polyurethane resins, polyurea resins, urea resins, melamine resins, acrylic resins, polyester resins, and polyamide resins. These materials may be used alone or in a combination of two or more.

The microcapsules 11 can be prepared by various microcapsulation methods, for example, interface polymerization, in-situ polymerization, phase separation, interface precipitation, or spray dry.

The microcapsules 11 preferably have approximately uniform sizes (average particle diameter). By doing so, the electrophoretic device can exhibit a further excellent display function. The sizes (average particle diameter) of the microcapsules 11 can be uniformized by, for example, filtration, sieving, or gravity difference sorting. The size (average particle diameter) of the microcapsule 11 is not particularly limited, but is preferably about 10 to 150 μm and more preferably 30 to 100 μm as the microcapsules 11 of a display module.

Liquid Phase Dispersion Medium

The liquid phase dispersion medium 14 may be an organic solvent having a relatively high insulation property. Examples of the organic solvent include aromatic hydrocarbons such as toluene, xylene, and alkylbenzenes; aliphatic hydrocarbons such as pentane, hexane, and octane; cyclic hydrocarbons such as cyclohexane and methylcyclohexane; halogenated hydrocarbons such as methylene chloride, chloroform, carbon tetrachloride, and 1,2-dichloroethane; various mineral oils or plant oils such as silicone oils, fluorine oils, and olive oils; and higher fatty acid esters. These organic solvents may be used alone or as a mixture.

The liquid phase dispersion medium 14 may contain various types of additives according to need, for example, a charge control agent such as an electrolyte, surfactant, metal soap, resin, rubber, oil, or varnish; a dispersant such as a titanium coupling agent, aluminum coupling agent, or silane coupling agent; a lubricant; or a stabilizer. The liquid phase dispersion medium 14 may further contain a dye such as anthraquinone or azo dye, according to need.

Electrophoretic Particles

The electrophoretic particles 12 and 13 may be organic or inorganic pigment particles or composites containing such particles.

Examples of the pigment include black pigments such as aniline black and carbon black; white pigments such as titanium dioxide, zinc white, and antimony trioxide; azo pigments such as monoazo, disazo, and polyazo; yellow pigments such as isoindolinone, chrome yellow, yellow iron oxide, cadmium yellow, titanium yellow, and antimony; red pigments such as quinacridone red and chromium vermilion; blue pigments such as phthalocyanine blue, indanthrene blue, anthraquinone pigments, iron blue, ultramarine blue, and cobalt blue; and green pigments such as phthalocyanine green.

Furthermore, these pigments may contain, according to need, a charge control agent composed of particles of an electrolyte, surfactant, metal soap, resin, rubber, oil, varnish, or a compound, a dispersant such as a titanium coupling agent, a lubricant, or a stabilizer.

The electrophoretic particles 12 and 13 are two types of electrophoretic particles that are different from each other in physical properties such as color tone or electrophoretic mobility, and move in the liquid phase dispersion medium 14 to a desired electrode side by electrophoresis through a potential difference.

Accordingly, an electric field is applied to the microcapsules 11 by applying a voltage between the thin-film circuit layer 42 and the transparent electrode layer 41, and the electrophoretic particles 12 and 13 move by electrophoresis in directions opposite to each other according to the direction of the electric field and are collected to the both end sides of the microcapsules 11. When the white electrophoretic particles 12 are collected to the display face side, the microcapsule 11 is displayed as a white pixel. Conversely, when the black electrophoretic particles 13 are collected to the display face side, the microcapsule 11 is displayed as a black pixel.

Resin Layer

The resin layer 19 is not particularly limited as long as it is excellent in compatibility and adhesion to the microcapsules 11 and has an insulation property. Examples of the material of the resin layer 19 include thermoplastic resins such as polyethylene, polyethylene chloride, ethylene-vinyl acetate copolymers, ethylene-ethyl acrylate copolymers, polypropylene, ABS resins, methyl methacrylate resins, vinyl chloride resins, vinyl chloride-vinyl acetate copolymers, vinyl chloride-vinylidene chloride copolymers, vinyl chloride-acrylate ester copolymers, vinyl chloride-methacrylic acid copolymers, vinyl chloride-acrylonitrile copolymers, ethylene-vinyl alcohol-vinyl chloride copolymers, propylene-vinyl chloride copolymers, vinylidene chloride resins, vinyl acetate resins, polyvinyl alcohols, polyvinyl formals, and cellulose resins; and polyamide resins.

The examples further include polymers such as polyacetals, polycarbonates, polyethylene terephthalates, polybutylene terephthalates, polyphenylene oxides, polysulfones, polyamide imides, polyaminobismaleimides, polyethersulfones, polyphenylene sulfones, polyacrylates, grafted polyphenylene ethers, polyetheretherketones, and polyether imides; fluorine resins such as polytetrafluoroethylenes, polyfluoroethylenepropylenes, ethylene tetrafluoride-perfluoroalkoxyethylene copolymers, ethylene-ethylene tetrafluoride copolymers, polyvinylidene fluorides, polyethylene trifluorochlorides, and fluororubber; silicon resins such as silicone resins and silicone rubber; and other materials such as methacrylic acid-styrene copolymers, polybutylene, and methyl methacrylate-butadiene-styrene copolymers. These resins may be used alone or in a combination of two or more.

It is preferable that the dielectric constant of the resin layer 19 and the dielectric constant of the liquid phase dispersion medium 14 be approximately the same. Therefore, the resin layer 19 preferably contains a dielectric constant controlling agent, for example, an alcohol such as 1,2-butanediol or 1,4-butanediol, a ketone, or a carboxylate salt.

Formation of Electrophoretic Layer

The electrophoretic layer (display layer) 15 can be prepared by mixing the microcapsules 11 in the resin layer 19 with the above-mentioned dielectric constant controlling agent according to need; applying the resulting resin composite (emulsion or organic solvent solution) on the thin-film circuit layer 42 of the first substrate 1 to form a coating by various coating methods, for example, a roll-coater method, a roll laminating method, a screen printing method, a spray method, or an ink jet method; and placing the transparent electrode layer 41 of the second substrate 2 on the resulting coating and pressing them.

Alternatively, the electrophoretic layer (display layer) 15 can be also prepared by applying the above-mentioned resin composite on the transparent electrode layer 41 of the second substrate 2 to form a coating; and placing the thin-film circuit layer 42 of the first substrate 1 on the coating and pressing them. Furthermore, the resin layer 19 can be eliminated according to need.

Second Substrate

The second substrate 2 is composed of a thin film (transparent insulating synthetic resin base) having the transparent electrode layer 41 on one surface, and is disposed above the electrophoretic layer (display layer) 15 such that the transparent electrode layer 41 lies between the second substrate 2 and the electrophoretic layer (display layer) 15.

The second substrate 2 is a substrate having flexibility and visible light permeability. Examples of the second substrate 2 also include substantially transparent (colorless and transparent, colored and transparent, or translucent) substrates. The term "substantially transparent" herein means a degree of transparency such that information displayed by the electrophoretic layer (display layer) 15 can be readily visually recognized. The second substrate 2 also has a function as a protection layer for supporting and protecting the transparent electrode layer 41 described below.

The thickness of the second substrate 2 is appropriately determined depending on, for example, the material and the application and is not particularly limited, but is preferably about 20 to 200 μm and more preferably about 25 to 100 μm as the transparent substrate of a display module.

The second substrate 2 is preferably a resin film, resin sheet, or resin plate having flexibility. Examples of the material of the second substrate 2 include various resins, for example, cellulose resins such as triacetyl cellulose (TAC), polyester resins such as polyethylene terephthalate (PET) and polyethylene naphthalate (PEN), polyethylene (PE) resins, polystyrene (PS) resins, polyvinyl chloride resins, polycarbonates (PC), polyether sulfones (PES), polyetheretherketones (PEEK), and polyphenylene sulfides (PPS). These resins may be used alone or in a combination of two or more.

Transparent Electrode Layer

The transparent electrode layer 41 is configured from, for example, a transparent electrically conductive film such as a tin-doped indium oxide film (ITO film). The transparent electrode layer 41 is formed so as to extend over approximately the entire one surface of the second substrate 2.

The transparent electrode layer 41 is in a film form (layer form) and functions as one electrode for applying a voltage to the electrophoretic layer (display layer) 15. Examples of the material of the transparent electrode layer 41 include electrically conductive resins such as polyacetylene, and electrically conductive resins containing electrically conductive metal particles, in addition to electrically conductive metal oxides such as tin-doped indium oxide (ITO), fluorine-doped tin oxide (FTO), indium oxide ($In_2O_3$), and tin oxide ($SnO_2$).

The thickness of the transparent electrode layer 41 is appropriately determined depending on, for example, the material and the application and is not particularly limited, but is preferably about 0.05 to 10 μm and more preferably about 0.05 to 5 μm as the transparent electrode of a display module.

The transparent electrode 41 may be formed on the thin film by any method, without particular limitation. Examples of the method include a sputtering method, an electron-beam method, an ion-plating method, a vacuum deposition method, and a chemical vapor deposition method (CVD method).

The thin-film circuit layer 42 of the first substrate 1 and the transparent electrode layer 41 of the second substrate 2 are electrically connected to each other outside the region where the electrophoretic layer (display layer) 15 is disposed. Specifically, the transparent electrode layer 41 and connection electrodes (terminals) of the thin-film circuit layer 42 are connected via electrically conductive connectors (not shown).

Furthermore, an electrophoretic sheet may be used instead of the electrophoretic layer (display layer) 15, the transparent electrode layer 41, and the second substrate 2. The electrophoretic sheet generally used is composed of a transparent electrode, an electrophoretic layer (display layer) 15, and an adhesive laminated in this order on PET, and an electrophoretic display can be formed only by bonding the electrophoretic sheet to a TFT glass substrate with the adhesive.

Cover Layer

The cover layer 17 is disposed on the surface 2a of the second substrate 2 on the opposite side of the display layer and is configured from a transparent moisture-proof sheet 6 which is a composite of a plurality of moisture-proof bases 3 and 4 and an inorganic material layer 5 disposed between the moisture-proof bases 3 and 4 at least such that the inorganic material layer 5 is in contact with the moisture-proof base 4 on the uppermost side.

The cover layer 17 thus disposed can increase the moisture-proof effect of the electrophoretic layer (display layer) 15 and can also protect the second substrate 2.

Moisture-Proof Sheet

The moisture-proof sheet 6 is not particularly limited as long as it is transparent and has a moisture-proof property. The moisture-proof bases 3 and 4 may be made of materials such as polyethylene terephthalate (PET) films and may be made of the same material or different materials. The thicknesses of the moisture-proof bases 3 and 4 may be the same or different.

Specifically, examples of the material of the transparent moisture-proof sheet 6 include fluorine resins, PCTFE (polychlorotrifluoroethylene), and trifluoroethylene resins, which are excellent in a moisture-proof property and transparency.

It is preferable that the thickness of the moisture-proof base 3 arranged on the display layer side is large. By dosing so, the moisture-proof base 3 can have a deep groove, which is described below.

The inorganic material layer 5 is not particularly limited as long as it is made of an inorganic material that can adsorb moisture. Examples of the inorganic material include inorganic microparticles such as silica and alumina.

Moisture-Proof Resin

The moisture-proof resin 20 is disposed between the cover layer 17 and the first substrate 1 at the sealing region 32 surrounding the periphery of the first substrate 1. The moisture-proof resin 20 bonds the first substrate 1 and the cover layer 17 and prevents moisture from infiltrating into the electrophoretic layer (display layer) 15, and thereby the moisture-proof property of the electrophoretic layer (display layer) 15 is maintained.

In the electrophoretic device 100 of this embodiment, the end faces of the cover layer 17 and the first substrate 1 and the end face of the moisture-proof resin 20 lie in the same plane.

The moisture-proof resin 20 is preferably an epoxy resin, a silicone resin, or an acrylic resin. Furthermore, those in which inorganic microparticles such as silica or alumina dispersed in these resins are preferably used.

When the moisture-proof property of the moisture-proof resin 20 is sufficient, moisture infiltrates from the outside to the inside of the electrophoretic display 100 using the surface where the moisture-proof resin 20 and the first substrate 1 are in contact to each other or the surface where the moisture-proof resin 20 and the cover layer 17 are in contact to each other as a diffusion path for the moisture. Therefore, in order to prevent the moisture from infiltrating to the inside, it is effective to enlarge the distance of these contacting surfaces (interface distance) connecting the outside and the inside, i.e., the diffusion paths for moisture. By doing so, the distance (interface distance) that outside moisture must pass through in order to infiltrate into the inside is enlarged, and thereby the moisture-proof property of the inside is maintained.

If the sealing width of the sealing region 32 is simply expanded, the interface distance is enlarged to increase the moisture-proof effect. However, this makes the display region 30 smaller, which is disadvantageous.

Grooves

As shown in FIG. 2, the surface 1a on the display layer side of the first substrate 1 and the surface 17b on the display layer side of the cover layer 17 are each provided with a plurality of grooves 1c so as to surround the display region 30.

By providing the grooves 1c, the interface distance of the moisture-proof resin 20 and the first substrate 1 and the interface distance of the moisture-proof resin 20 and the cover layer 17 can be enlarged without expanding the sealing width W of the sealing region 32.

By doing so, the amount of moisture that infiltrates into the electrophoretic layer (display layer) 15, i.e., the inside of the electrophoretic display 100, from the outside of the electrophoretic display 100 through these contacting surfaces can be decreased.

Even if the grooves 1c are provided, the sealing width W of the sealing region 32 is not increased. Therefore, the size of the display region 30 can be maintained large, and thereby the display performance of the electrophoretic display can be maintained.

It is preferred to provide a plurality of the grooves 1c. By providing a plurality of the grooves 1c, the interface distance can be enlarged, and the moisture-proof property can be further improved.

The grooves 1c may be provided in a surface on the display layer side of either the first substrate 1 or the cover layer 17. Even in the case that either the first substrate 1 or the cover layer 17 is provided with the grooves 1c on the display layer side, the interface distance can be enlarged, and the moisture-proof property can be improved.

The grooves 1c provided in the surface 1a of the first substrate 1 on the display layer side have a depth $d_1$ of one half or less the thickness L of the first substrate 1.

Thus, the depth $d_1$ of the grooves 1c provided in the surface 1a of the first substrate 1 on the display layer side is preferably one half or less the thickness L of the first substrate 1.

When the depth $d_1$ of the grooves 1c is deeper than one half the thickness L of the first substrate 1, the mechanical strength of the first substrate 1 is decreased, which may cause breakage of the first substrate 1. The threat of such breakage does not exist when the depth $d_1$ of the grooves 1c is one half or less the thickness L of the first substrate 1.

The grooves 1c provided in the surface 17b of the moisture-proof base 3 on the display layer side has a depth $d_3$ shallower than the thickness T of the moisture-proof base 3 so that the grooves do not pass through the inorganic material layer 5.

Thus, the depth $d_3$ of the grooves 1c provided in the surface 17b of the moisture-proof base 3 on the display layer side is preferably shallower than the thickness T of the moisture-proof base 3.

When the depth $d_3$ of the grooves 1c is deeper than the thickness T of the moisture-proof base 3, the inorganic material layer 5 is exposed, and therefore the moisture infiltrated through the interface readily infiltrates into the inorganic material layer 5, resulting in a decrease in the moisture-proof effect of the inorganic material layer 5. When the depth $d_3$ of the grooves 1c is shallower than the thickness T of the moisture-proof base 3, the inorganic material layer 5 is not exposed, and the moisture-proof effect can be maintained.

Embodiment 2

Figure 3:
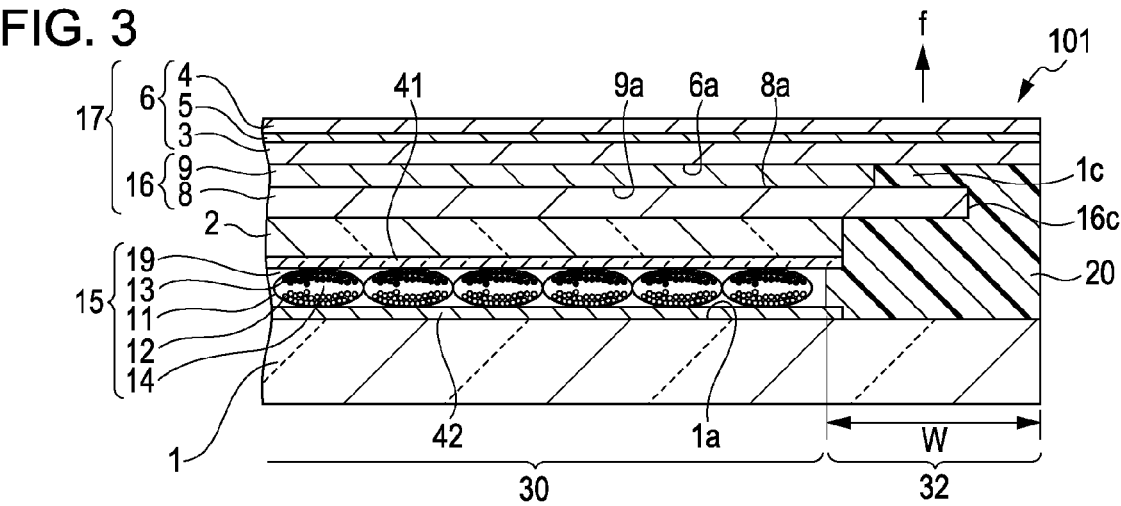
FIG. 3 is a cross-sectional view illustrating an electrophoretic display according to the invention.

FIG. 3 is a cross-sectional view illustrating another electrophoretic display according to an embodiment of the invention.

The electrophoretic display 101 according to this embodiment of the invention is configured to be the same as that in Embodiment 1 except that the groove 1c is provided in the side face of the cover layer 17.

The cover layer 17 is disposed on the surface 2a of the second substrate 2 on the opposite side of the display layer and is configured from a transparent moisture-proof sheet 6 and a moisture-proof subsidiary sheet 16. The transparent moisture-proof sheet 6 is composed of a laminate of a plurality of moisture-proof bases 3 and 4 and an inorganic material layer 5 disposed between the moisture-proof bases 3 and 4 at least such that the inorganic material layer 5 is in contact with the moisture-proof base 4 on the uppermost side, and the moisture-proof subsidiary sheet 16 is composed of moisture-proof bases 8 and 9. The thus provided cover layer 17 can increase the moisture-proof performance of the electrophoretic layer (display layer) 15 and also can protect the second substrate 2.

One of the moisture-proof bases, the moisture-proof base 8 that is disposed on the display layer side, has a contacting surface 8a with a size larger than that of the contacting surface 9a of the other of the moisture-proof bases, the moisture-proof base 9 that is disposed on the opposite side of the display layer. Thus, the groove 1c is provided in the side face 16c of the moisture-proof subsidiary sheet 16. The depth of the groove 1c from the side face 16c is determined not to reach the display region 30. When the depth of the groove 1c from the side face 16c is deeper than such a depth, the display performance may be deteriorated.

Even in such a configuration, since the groove 1c is provided, the interface distance between the moisture-proof resin 20 and the first substrate 1 and the interface distance between the moisture-proof resin 20 and the cover layer 17 can be enlarged without a decrease in the sealing width W of the sealing region 32.

By enlarging the interface distance between the moisture-proof resin 20 and the first substrate 1 and the interface distance between the moisture-proof resin 20 and the cover layer 17, the amount of moisture that infiltrates into the electrophoretic layer (display layer) 15 from the outside of the electrophoretic display 101 through these interfaces can be decreased.

Since the sealing width W of the sealing region 32 is not increased even if the groove 1c is provided, the display region 30 can be maintained large, and therefore the display performance of the electrophoretic display can be maintained.

Furthermore, a plurality of the moisture-proof subsidiary sheets 16 may be laminated. Since a plurality of the grooves 1c can be provided by laminating a plurality of the moisture-proof subsidiary sheets 16, the moisture-proof effect can be increased.

The moisture-proof subsidiary sheet 16 may have the groove 1c at the side face of the moisture-proof base 8. The moisture-proof effect can be increased by using the moisture-proof subsidiary sheet 16 provided with the groove 1c in the side face.

Embodiment 3

Figure 4:
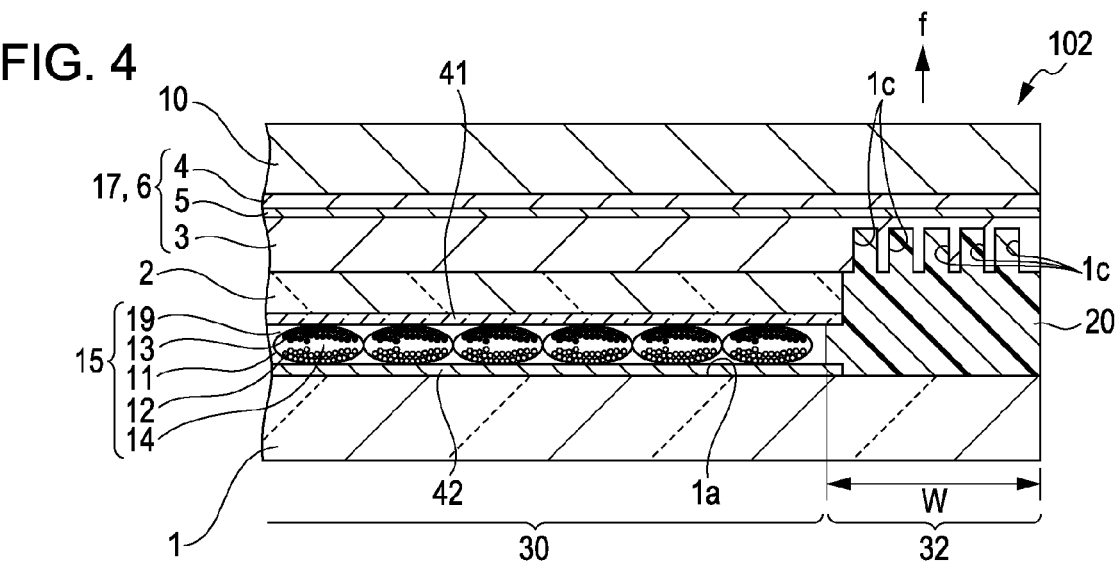
FIG. 4 is a cross-sectional view illustrating an electrophoretic display according to the invention.

FIG. 4 is a cross-sectional view illustrating another electrophoretic display according to an embodiment of the invention.

The electrophoretic display 102 according to this embodiment of the invention is configured to be the same as that in Embodiment 1 except that the grooves 1c are provided only in a surface 17b on the display layer side of the cover layer 17, and the other surface 17a of the cover layer 17 on the opposite side of the display layer is bonded to a surface protection sheet 10.

The surface protection sheet 10 is not particularly limited as long as it is a transparent material that can exhibit a surface protection effect without hindering image display, and is preferably a resin film having flexibility. Examples of the material include various resins, for example, cellulose resins such as triacetyl cellulose (TAC), polyester resins such as polyethylene terephthalate (PET) and polyethylene naphthalate (PEN), polyethylene (PE) resins, polystyrene (PS) resins, polyvinyl chloride resins, polycarbonates (PC), polyether sulfones (PES), polyetheretherketones (PEEK), and polyphenylene sulfides (PPS). These resins may be used alone or in a combination of two or more.

Even in such a configuration, since the grooves 1c are provided, the interface distance between the moisture-proof resin 20 and the first substrate 1 and the interface distance between the moisture-proof resin 20 and the cover layer 17 can be enlarged without a decrease in the sealing width W of the sealing region 32.

By enlarging the interface distance between the moisture-proof resin 20 and the first substrate 1 and the interface distance between the moisture-proof resin 20 and the cover layer 17, the amount of moisture that infiltrates into the electrophoretic layer (display layer) 15 from the outside of the electrophoretic display 102 through these interfaces can be decreased.

Since the sealing width W of the sealing region 32 is not increased even if the grooves 1c are provided, the display region 30 can be maintained large, and therefore the display performance of the electrophoretic display can be maintained.

Furthermore, the surface protection sheet 10 can protect the cover layer 17 from mechanical impact from the outside. Consequently, the cover layer 17 is not damaged even if some impact is applied, and, therefore, since the inorganic material layer 5 is not exposed, the moisture-proof property of the electrophoretic display can be maintained.

Embodiment 4

Figure 5:
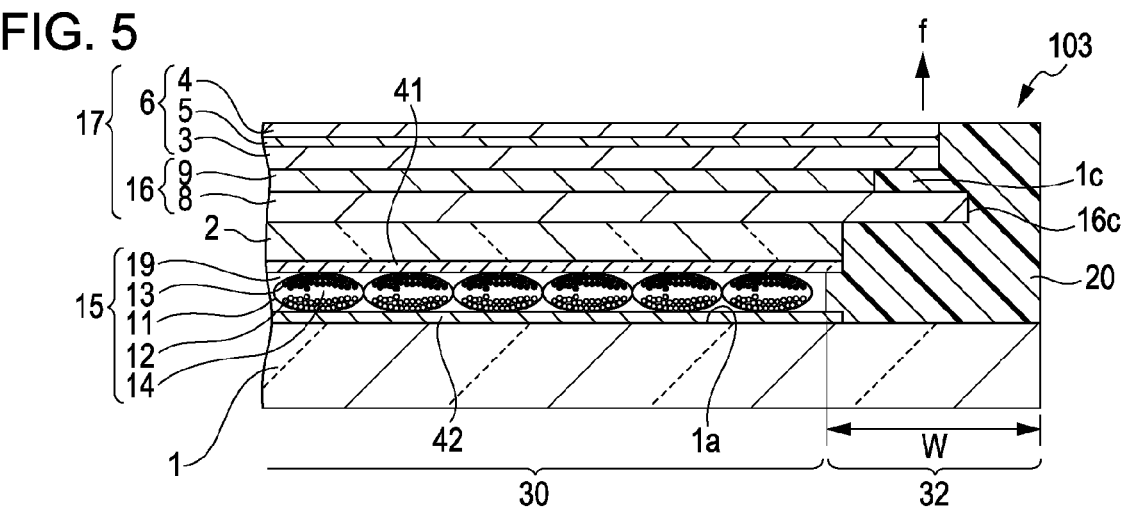
FIG. 5 is a cross-sectional view illustrating an electrophoretic display according to the invention.

FIG. 5 is a cross-sectional view illustrating another electrophoretic display according to an embodiment of the invention.

The electrophoretic display 103 according to this embodiment of the invention is configured to be the same as that in Embodiment 2 except that a surface of the moisture-proof resin 20 on the opposite side of the first substrate 1 is not covered with the cover layer 17 in the sealing region 32.

Even in such a configuration, since the groove 1c is provided, the interface distance between the moisture-proof resin 20 and the first substrate 1 and the interface distance between the moisture-proof resin 20 and the cover layer 17 can be enlarged without a decrease in the sealing width W of the sealing region 32.

By enlarging the interface distance between the moisture-proof resin 20 and the first substrate 1 and the interface distance between the moisture-proof resin 20 and the cover layer 17, the amount of moisture that infiltrates into the electrophoretic layer (display layer) 15 from the outside of the electrophoretic display 103 through these interfaces can be decreased.

Since the sealing width W of the sealing region 32 is not increased even if the groove 1c is provided, the display region 30 can be maintained large, and therefore the display performance of the electrophoretic display can be maintained.

Embodiment 5

Figure 6:
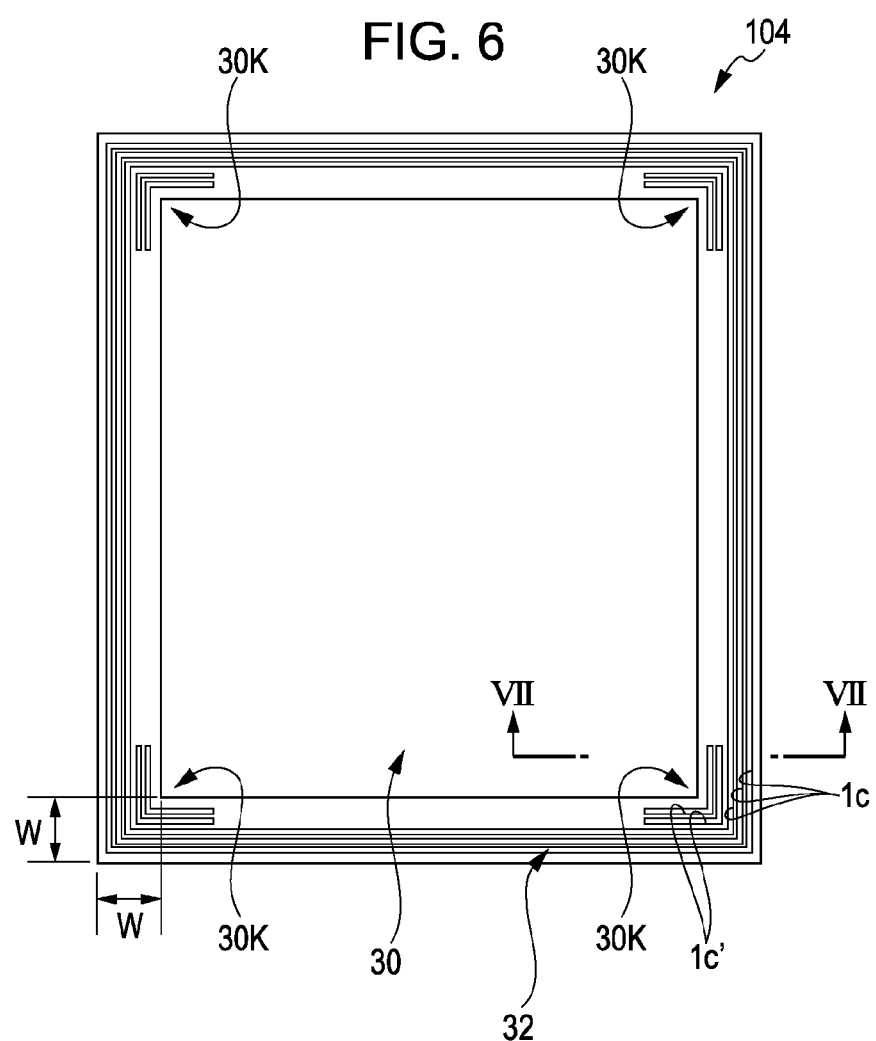
FIG. 6 is a plan view illustrating an electrophoretic display according to the invention.
Figure 7:
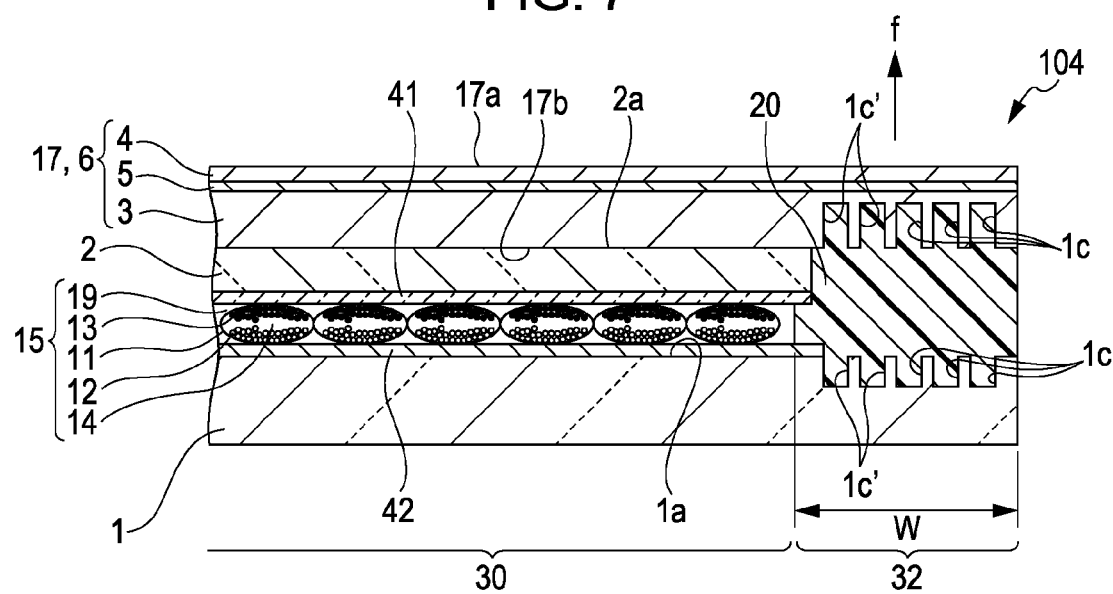
FIG. 7 is a cross-sectional view illustrating the electrophoretic display according to the invention.

FIGS. 6 and 7 show another electrophoretic display according to an embodiment of the invention and are a plan view and a cross-sectional view, respectively.

As shown in FIG. 6, the electrophoretic display 104 according to this embodiment of the invention is configured to be the same as that in Embodiment 1 except that the surface 1a on the display layer side of the first substrate 1 and the surface 17b on the display layer side of the cover layer 17 are provided with grooves 1c' so as to surround the corners 30k of the display region 30.

In the electrophoretic display 104 according to this embodiment of the invention, the grooves 1c' are provided in the surfaces 1a and 17b on the display layer sides of the first substrate 1 and the cover layer 17 so as to surround the corners 30k of the display region 30. The grooves 1c' are an L-shape in a plan view so as to fit the shape of the corners 30k.

In the electrophoretic display 104 according to this embodiment of the invention, the grooves 1c' may be provided in either the surface 1a on the display layer side of the first substrate 1 or the surface 17b on the display layer side of the cover layer 17 so as to surround the corners 30k of the display region 30.

Though moisture infiltrates from one side face in the portion other than the corners, at the corners 30k, moisture infiltrates from two side faces. In particular, moisture is effectively prevented from infiltration at the corners 30k by increasing the number of grooves at the corners 30k by providing the grooves 1c' for the corners 30k. Thus, the moisture-proof property of the electrophoretic display 104 can be improved.

Embodiment 6

Embodiments of the electronic device having the electrophoretic display according to any of the above-described Embodiments will now be described.

Figure 8:
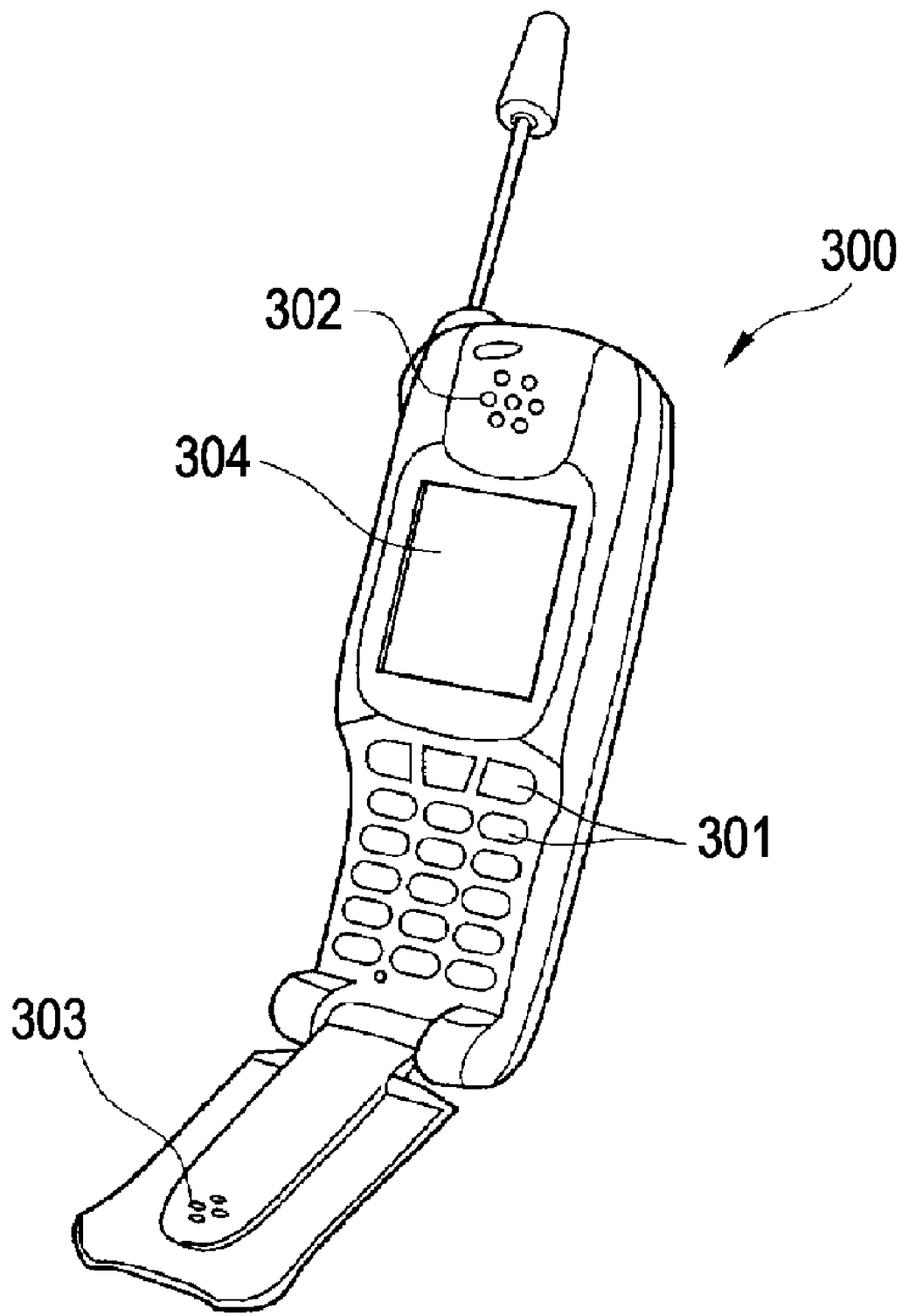
FIG. 8 is a perspective view illustrating an electronic device according to the invention.

FIG. 8 is a perspective view illustrating an embodiment when the electronic device according to the invention is applied to a mobile phone.

The mobile phone 300 includes a plurality of operation buttons 301, an earpiece 302, a mouthpiece 303, and a display panel 304. In this mobile phone 300, the display panel 304 is the electrophoretic display of this embodiment.

Figure 9:
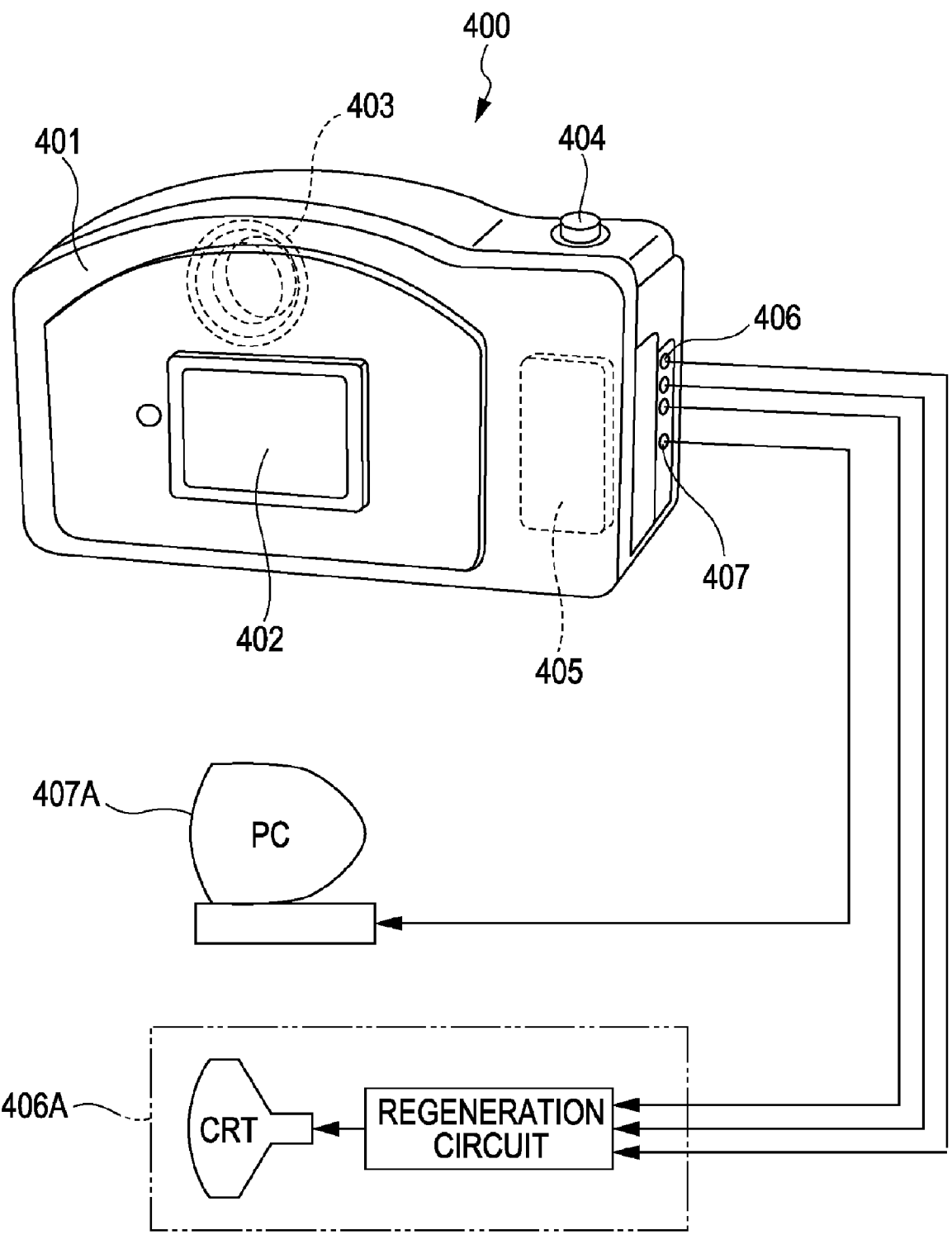
FIG. 9 is a perspective view illustrating an electronic device according to the invention.

FIG. 9 is a perspective view illustrating an embodiment when the electronic device according to the invention is applied to a digital still camera. In FIG. 9, the back side of the paper is called "the front", and the front side of the paper is called "the back"

In FIG. 9, a connection state with exterior equipment is also simply shown.

The digital still camera 400 includes a case 401, a display panel 402 disposed at the back of the case 401, a light-receiving unit 403 disposed on the observation side (in FIG. 9, the back side of the paper) of the case 401, a shutter button 404, and a circuit board 405. The light-receiving unit 403 includes, for example, an optical lens and a CCD (charge coupled device). The display panel 402 conducts displaying based on an imaging signal outputted from the CCD. The imaging signal of the CCD at the time when the shutter button 404 is pressed is transferred to the circuit board 405 and is stored therein. In this digital still camera 400, a side face of the case 401 is provided with video signal output terminals 406 and an input-output terminal 407 for data communication. The video signal output terminals 406 are connected to, for example, a TV monitor 406A, and the input-output terminal 407 is connected to, for example, a personal computer 407A, according to need. In the digital still camera 400, imaging signals stored in the memory of the circuit board 405 are outputted to the TV monitor 406A or the personal computer 407A by predetermined operation. In the digital still camera 400, the display panel 402 is the electrophoretic display of this embodiment.

Figure 10:
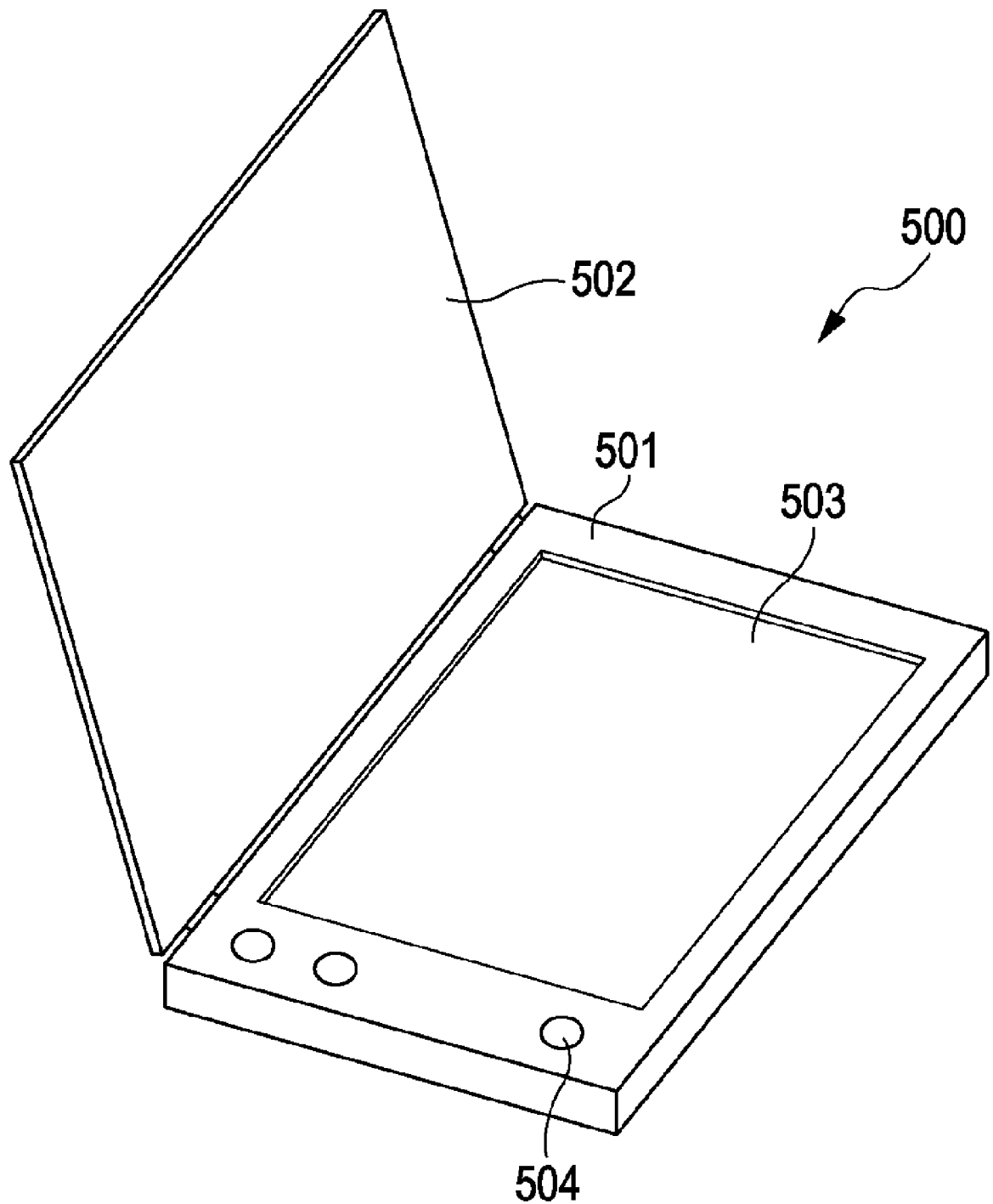
FIG. 10 is a perspective view illustrating an electronic device according to the invention.

FIG. 10 is a perspective view illustrating an embodiment when the electronic device according to the invention is applied to an electronic book. The electronic book 500 includes a book-shaped frame 501 and a (openable) cover 502 that is turnable with respect to the frame 501. The frame 501 is provided with a display device 503 in the state that the display face is exposed and an operating portion 504. In the electronic book 500, the display device 503 is the electrophoretic display of this embodiment.

Figure 11:
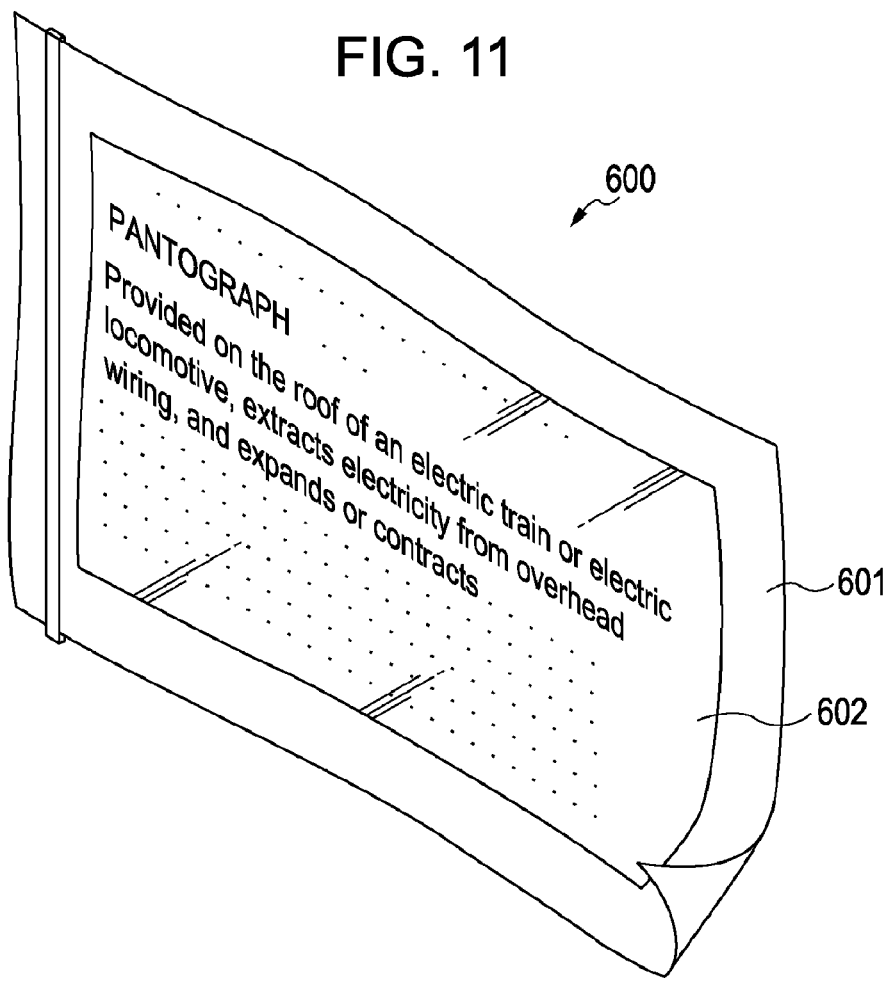
FIG. 11 is a perspective view illustrating an electronic device according to the invention.

FIG. 11 is a perspective view illustrating an embodiment when the electronic device according to the invention is applied to an electronic paper. The electronic paper 600 includes a body 601 of a rewritable sheet having texture and flexibility similar to those of paper and a display unit 602. In the electronic paper 600, the display unit 602 is the electrophoretic display of this embodiment.

Figure 12:
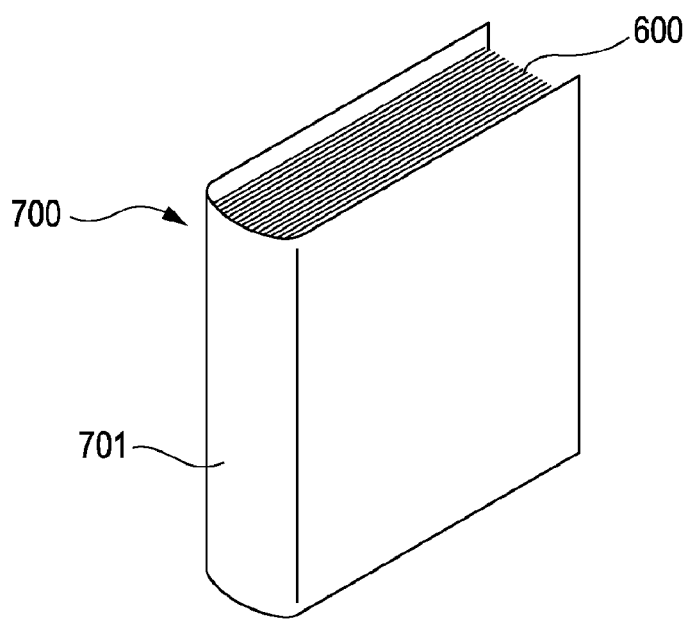
FIG. 12 is a perspective view illustrating an electronic device according to the invention.

FIG. 12 is a perspective view illustrating an embodiment when the electronic device according to the invention is applied to an electronic notebook. The electronic notebook 700 includes a cover 701 and a plurality of electronic papers 600. The electronic paper 600 has the same configuration as that of the electronic paper 600 shown in FIG. 11. The plurality of the electronic papers 600 is bundled so as to be held by the cover 701. The cover 701 is provided with an input unit for inputting display data. This allows changing the display content in the state that the electronic papers 600 are bundled. In the electronic notebook 700, the display unit of the electronic paper 600 is the electrophoretic display of this embodiment.

The electronic device of the invention is not limited to those described above, and examples of the electronic device include televisions, view finder-type and monitor direct view-type video tape recorders, in-car navigation systems, pagers, electronic notepads, calculators, electronic newspapers, word processors, personal computers, workstations, TV telephones, POS terminals, and devices having touch panels. The electrophoretic display according to the embodiment of the invention can be applied to the displays of these various types of the electronic devices.

Embodiments according to the invention, i.e., the electro-optical display, the electrophoretic display, and the electronic device, are described above, but the invention is not limited thereto. For example, each part constituting the electrophoretic display according to the invention can be replaced by another one that can exhibit a similar function, or another configuration may be added. For example, one or more additional layers for some purpose may be displaced between the circuit board and the electrode and/or transistor or between the opposite substrate and the opposite electrode.

In the above-described embodiments, electrophoretic layers employing microcapsules are described as illustrative embodiments, but other electrophoretic layers, for example, a type having a plurality of cells (small spaces) that are formed with division walls and each contain electrophoretic dispersion, can be also used.

Though the electro-optical display 150 is described above using the electrophoretic displays 100 to 104, the electro-optical display 150 can also be an organic EL display or a liquid crystal display by using an organic EL layer or a liquid crystal display layer instead of the electrophoretic layer (display layer) 15.

An Example of the invention will be specifically described below. However, the invention is not limited to the Example.

EXAMPLE

The following Example is a specific example based on Embodiment 1 described with reference to FIGS. 1 and 2.

First, five grooves having a width of 0.1 mm and a depth of 0.2 mm were formed at a portion which becomes a sealing region in a surface of a glass substrate (manufactured by Asahi Glass Co., Ltd., trade name: OA-10) having a thickness of 0.5 mm and being provided with TFTs over the surface such that the grooves surround a display region.

Similarly, five grooves having a width of 0.1 mm and a depth of 0.1 mm were formed at a portion which becomes a sealing region in a surface of a moisture-proof sheet (manufactured by Kureha, trade name: Cellel) having a thickness of 0.22 mm such that the grooves surround the display region. The depth of the grooves was smaller than the thickness of the moisture-proof material to which the grooves were formed so that the organic material layer of the moisture-proof sheet would not be exposed.

Then, an electrophoretic sheet (manufactured by EInk, registered trade name: Vizplex, EP sheet: PET, a sheet composed of a transparent electrode, microcapsules, and an adhesive that are laminated in series) was bonded to the surface, on the side where the grooves were formed, of the glass substrate at the portion to be used as the display region.

Then, a moisture-proof resin (manufactured by Hitachi Chemical Co., Ltd., trade name: Taffi) was applied to the sealing region surrounding the display region, and the moisture-proof sheet was bonded to the glass substrate such that the grooves of the moisture-proof sheet oppose to the grooves of the glass substrate.

Lastly, a surface protection sheet (manufactured by Nitto Jushi Kogyo Co. Ltd., trade name: Clarex) having a thickness of 0.5 mm was bonded to the moisture-proof sheet with an adhesive to produce an electrophoretic display.

Although the frame of the electrophoretic display produced by the above-described process was narrow, its moisture-proof property was high.

The entire disclosure of Japanese Patent Application No. 2008-073583, filed Mar. 21, 2008 is expressly incorporated by reference herein.

What is claimed is:
1. An electro-optical display comprising:
   a first substrate and a second substrate opposing to each other;
   a display layer disposed between the first substrate and the second substrate; and
   a cover layer covering a surface of the second substrate on an opposite side of the display layer, wherein
   a surface of the display layer disposed on the first substrate is a display face, and the first substrate and the cover layer are bonded with a moisture-proof resin disposed at a sealing region surrounding the display face; and the first substrate and/or the cover layer have a groove in the surface that is in contact with the moisture-proof resin, and the groove is filled with the moisture-proof resin.

2. The electro-optical display according to claim 1, wherein the groove is provided in a surface on the display layer side of the first substrate in the sealing region, and the depth of the groove is one half or less the thickness of the first substrate.

3. The electro-optical display according to claim 1, wherein the groove is provided in a surface on the display layer side of the cover layer in the sealing region.

4. The electro-optical display according to claim 3, wherein the cover layer is composed of a laminate of a plurality of moisture-proof bases and an inorganic material layer disposed between the moisture-proof bases at least such that the inorganic material layer is in contact with the moisture-proof base on the uppermost side; and the groove has a depth such that the groove does not pass through the inorganic material layer.

5. The electro-optical display according to claim 1, wherein the groove is provided at the side end of the cover layer in the sealing region.

6. The electro-optical display according to claim 5, wherein the cover layer is composed of a laminate of a plurality of moisture-proof bases and an inorganic material layer disposed between the moisture-proof bases at least such that the inorganic material layer is in contact with the moisture-proof base on the uppermost side; and the groove is arranged nearer the display layer than the inorganic material layer.

7. The electro-optical display according to claim 1, wherein the groove surrounds a corner of the display region.

8. The electro-optical display according to claim 1, wherein a plurality of the grooves is provided.

9. The electro-optical display according to claim 1, wherein a surface protection sheet is bonded to a surface of the cover layer on the opposite side with respect to the display layer.

10. An electrophoretic display comprising:

a first substrate and a second substrate opposing to each other;

an electrophoretic layer disposed between the first substrate and the second substrate; and a cover layer covering the surface of the second substrate on an opposite side of the electrophoretic layer, wherein a surface of the electrophoretic layer disposed on the first substrate is a display face, and the first substrate and the cover layer are bonded with a moisture-proof resin disposed at a sealing region surrounding the display face; and the first substrate and/or the cover layer have a groove in the surface that is in contact with the moisture-proof resin, and the groove is filled with the moisture-proof resin.

11. An electronic device comprising the electro-optical display according to claim 1 or the electrophoretic display according to claim 10.

* * * * *